(12) United States Patent  
Opsenica et al.

(10) Patent No.: US 10,958,965 B2  
(45) Date of Patent: Mar. 23, 2021

(54) VIDEO STREAM SYNCHRONIZATION

(71) Applicant: Telefonaktiebolaget LM Ericsson (publ), Stockholm (SE)

(72) Inventors: Miljenko Opsenica, Espoo (FI); Le Wang, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 706 days.

(21) Appl. No.: 15/522,932

(22) PCT Filed: Oct. 31, 2014

(86) PCT No.: PCT/SE2014/051290  
§ 371 (c)(1),  
(2) Date: Apr. 28, 2017

(87) PCT Pub. No.: WO2016/068768  
PCT Pub. Date: May 6, 2016

(65) Prior Publication Data  
US 2017/0332131 A1    Nov. 16, 2017

(51) Int. Cl.  
*H04N 21/43* (2011.01)  
*H04L 12/26* (2006.01)  
(Continued)

(52) U.S. Cl.  
CPC ....... H04N 21/4305 (2013.01); *H04B 10/116* (2013.01); *H04L 43/04* (2013.01);  
(Continued)

(58) Field of Classification Search  
CPC ............. H04W 56/00; H04W 56/0005; H04W 56/001; H04W 56/0015; H04W 56/002;  
(Continued)

(56) References Cited

U.S. PATENT DOCUMENTS

| | | |
|---|---|---|
| 6,317,166 B1 | 11/2001 | McCutchen |
| 7,411,604 B2 | 8/2008 | Trinkel et al. |

(Continued)

FOREIGN PATENT DOCUMENTS

| | | |
|---|---|---|
| CN | 103051387 A | 4/2013 |
| CN | 103999455 A | 8/2014 |

(Continued)

OTHER PUBLICATIONS

Shrestha, Prarthana et al., "Synchronization of Multiple Video Recordings based on Still Camera Flashes," MM'06, Oct. 23-27, 2006, Santa Barbara, California, USA, pp. 137-140.

(Continued)

*Primary Examiner* — Ashley Shivers  
(74) *Attorney, Agent, or Firm* — Rothwell, Figg, Ernst & Manbeck, P.C.

(57) ABSTRACT

A system clock reference is transmitted to user devices (1, 2, 3) over a short range communication channel (40) and used to calculated a clock offset. The clock offset is stored together with a user identifier in a server memory (15), from which the clock offset can be retrieved when receiving the user identifier together with a video stream (21, 22, 23) of video frames (31, 32, 33) tagged with respective timestamps. The timestamps are converted into capture times according to a system clock (17) using the retrieved clock offsets. Video streams (21, 22, 23) from multiple user devices (1, 2, 3) thereby have video frames timestamped using a same clock reference and can be time aligned.

19 Claims, 10 Drawing Sheets

(51) Int. Cl.
*H04W 56/00* (2009.01)
*H04W 72/12* (2009.01)
*H04B 10/116* (2013.01)

(52) U.S. Cl.
CPC ..... *H04N 21/4302* (2013.01); *H04N 21/4307* (2013.01); *H04W 56/0015* (2013.01); *H04W 72/1263* (2013.01)

(58) Field of Classification Search
CPC ............ H04W 56/003; H04W 56/004; H04W 72/1263; H04L 1/1838; H04L 1/1877; H04L 43/04; H04N 21/236; H04N 21/2368; H04N 21/238
See application file for complete search history.

(56) References Cited

U.S. PATENT DOCUMENTS

| | | | | |
|---|---|---|---|---|
| 2009/0298420 | A1* | 12/2009 | Haartsen | H04J 3/0658 455/3.06 |
| 2010/0225811 | A1* | 9/2010 | Konvisser | G11B 27/28 348/512 |
| 2011/0164881 | A1* | 7/2011 | Rajagopal, Sr. | H04B 10/1149 398/128 |
| 2012/0128061 | A1* | 5/2012 | Labrozzi | H04N 21/234354 375/240.02 |
| 2012/0206566 | A1* | 8/2012 | Fedoseyeva | G06Q 10/06398 348/38 |
| 2013/0094850 | A1 | 4/2013 | Yamasaki | |
| 2013/0124461 | A1* | 5/2013 | Dombrowski | G06F 16/48 707/610 |
| 2013/0278728 | A1 | 10/2013 | Gong et al. | |
| 2014/0064701 | A1* | 3/2014 | Woodman | H04N 5/765 386/241 |
| 2014/0113598 | A1 | 4/2014 | Conti | |
| 2014/0269673 | A1* | 9/2014 | Yin | H04J 3/0667 370/350 |
| 2014/0270796 | A1* | 9/2014 | Jovicic | H04B 10/1141 398/128 |
| 2015/0092642 | A1* | 4/2015 | Geboff | H04L 69/329 370/311 |
| 2015/0130897 | A1* | 5/2015 | D'Amato Damato | H04N 13/139 348/43 |
| 2016/0088222 | A1* | 3/2016 | Jenny | H04N 5/23238 348/36 |

FOREIGN PATENT DOCUMENTS

| | | |
|---|---|---|
| EP | 2 134 080 A2 | 12/2009 |
| EP | 2 713 609 A1 | 4/2014 |
| JP | 2013-74466 A | 4/2013 |
| WO | 2013/089769 A1 | 6/2013 |

OTHER PUBLICATIONS

Rajagopal, Niranjini et al., "Visual Light Landmarks for Mobile Devices," IPSN '14 Proceedings of the 13th international symposium on Information processing in sensor networks, Apr. 15-17, 2014, 12 pages.

International Search Report and Written Opinion issued in International Application No. PCT/SE2014/051290, dated May 15, 2015, 10 pages.

First Chinese Office Action with English translation, issued in corresponding Chinese Application No. 201480082634.4, dated Jun. 19, 2019, 28 pages.

* cited by examiner

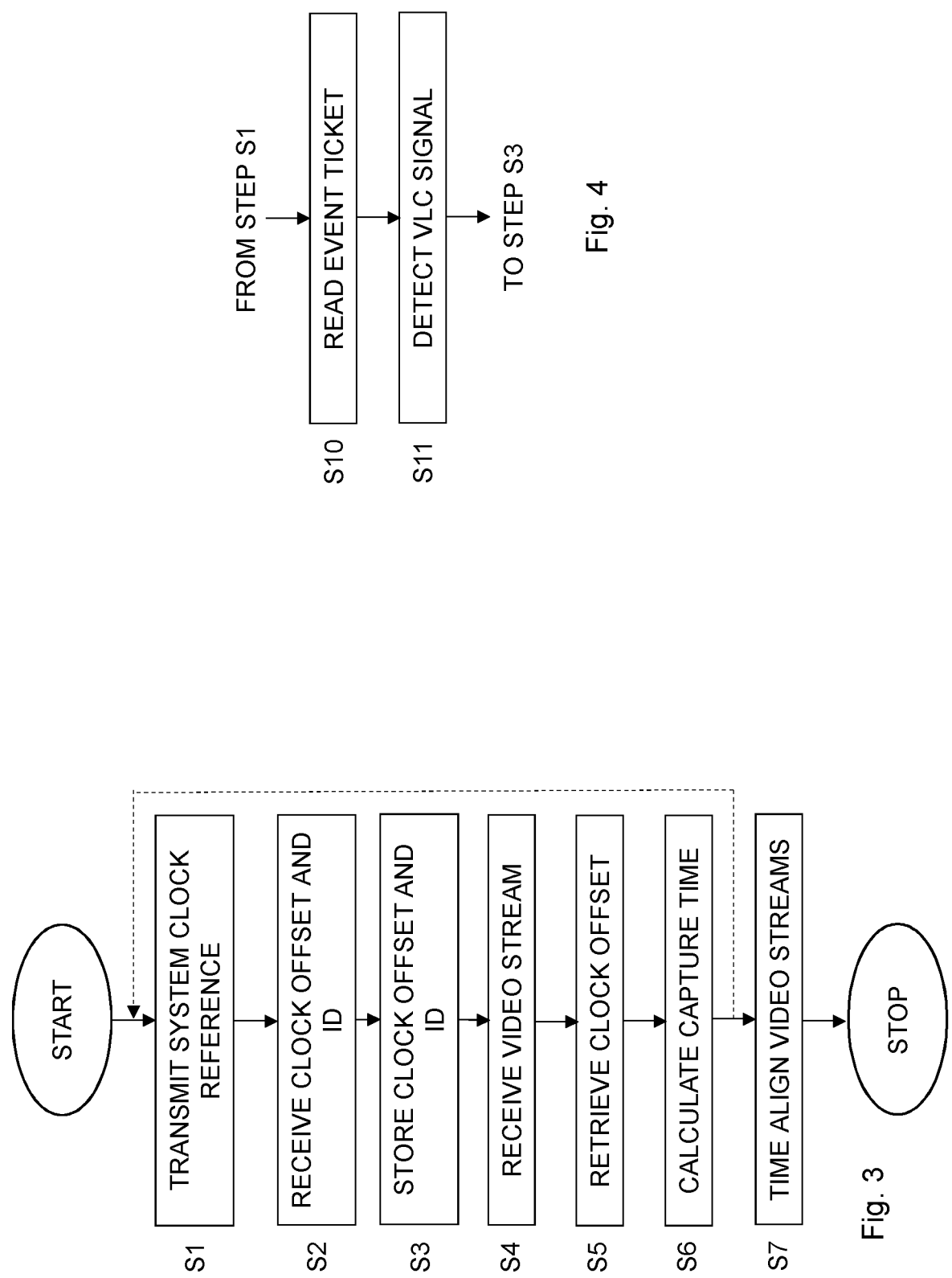

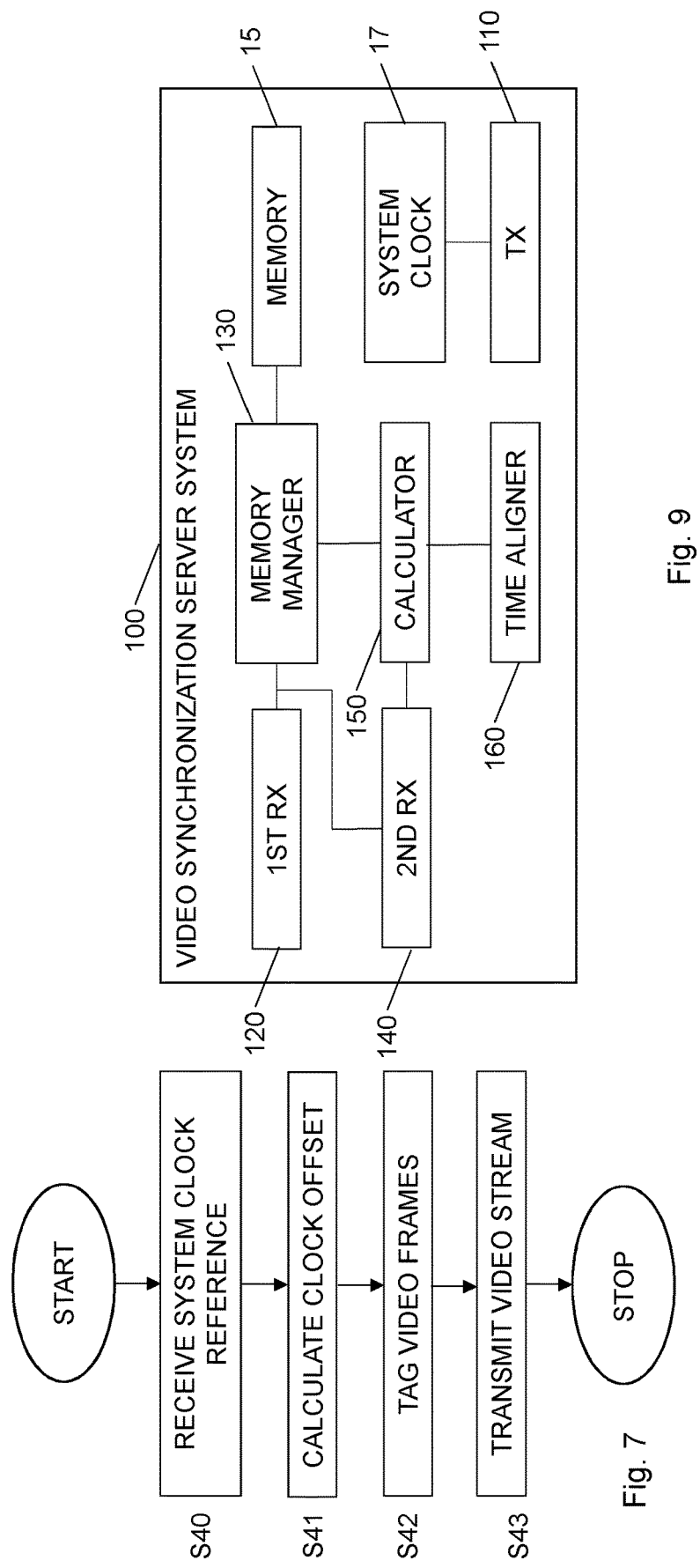

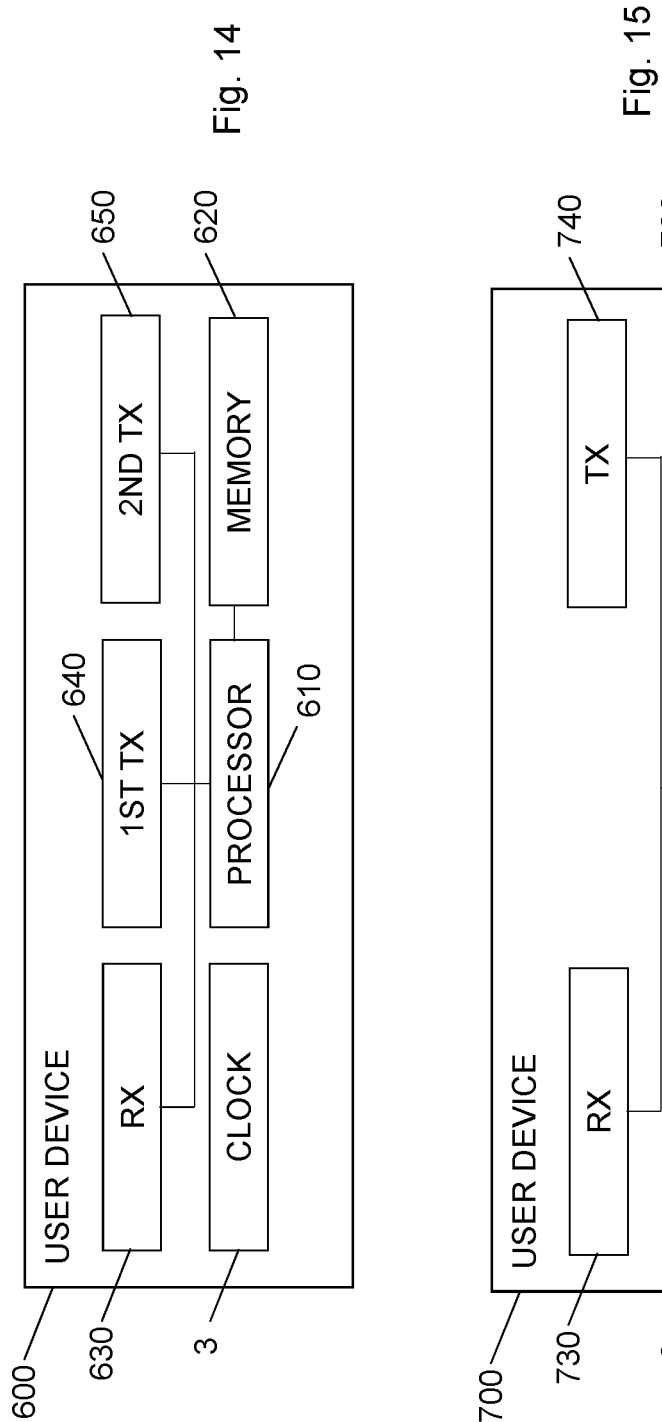

US 10,958,965 B2

VIDEO STREAM SYNCHRONIZATION

CROSS REFERENCE TO RELATED APPLICATION(S)

This application is a 35 U.S.C. § 371 National Stage of International Patent Application No. PCT/SE2014/051290, filed Oct. 31, 2014, designating the United States, the disclosure of which is incorporated by reference.

TECHNICAL FIELD

The present embodiments generally relate to video stream synchronization, and in particular to synchronization of video streams originating from multiple user devices recording a scene.

BACKGROUND

The advance of high-speed mobile Internet and capacity of user devices, such as mobile phones, smartphones and tablets, has given rise to a new way of consuming mobile live video streaming services. There is also a high demand from users to film a social event, e.g. a football game or a music festival in order to present the users' own version of storytelling. The emerging applications allow users to produce videos collaboratively using multiple mobile cameras, in a manner similar to how professional live TV is produced. As shown in FIG. 1, the scenario includes three user roles, namely producers, directors and consumers. The producers are users with user devices 1, 2, 3 who collaboratively record and stream video feeds, for example, in a stadium to application servers or a server system 10. A mixed view of video feeds enables the directors to conduct video direction and rich-content assertion. The consumers, thus, are able to watch live broadcast of the event from different viewpoints based on the directors' selection rather than only few options provided by traditional TV broadcasting.

In a social multimedia environment, it is desirable for directors to monitor synchronized video streams from the producers. Simply simultaneously sending each video stream to its physical output hardware will not necessarily ensure synchronization. In professional live video production, the synchronization among multiple camera feeds is done by specialized hardware. However, this approach is not practical when streaming video from user devices 1, 2, 3 via wireless connection. The reason being that delay is an inherent feature of wireless networks and network congestion often happens when the volume of data traffic goes up. This implies that each user device 1, 2, 3 experiences different network delays, which may further vary for a given user device 1, 2, 3 over time. As a consequence, the differences and variations in network delay cause the arrival time of each video stream at the server system 10 to be different. The divergence in arrival time has great impact on the perceived video frames resulting in asynchrony in the live feeds presented to the directors. This means that the directors will not be able to edit the multiple video streams in synchrony. As shown in FIG. 2 illustrating video streams 21, 22, 23 from user devices 1, 2, 3, the marked video frames 31, 32, 33 are taken by the cameras of the user devices 1, 2, 3 at the same time. Due to the network delay, the time when the marked video frames 31, 32, 33 arrive at the server system 10 is different. Thus, one of the most import requirements of social video streaming is adequate synchronization so that each video stream is aligned to each other. The multi-producer video filming turns out to be a problem of asynchrony, which has to be solved.

Various techniques for achieving synchronization among video streams have been proposed in the art.

In a solution clock synchronization is used. Synchronization offsets are calculated using timestamps generated by the cameras' internal clocks on the user devices 1, 2, 3. This solution is one of the most processing efficient methods. However, some user devices 1, 2, 3 do not have an internal high-resolution clock. Thus, clock drift and skew may cause the user devices 1, 2, 3 out of synchronization. In addition, the solution requires all the user devices 1, 2, 3 to synchronize with a centralized Network Time Protocol (NTP) server. The transmission delay between each user device 1, 2, 3 and the server system 10 would also vary from each other, especially when wireless network is highly congested.

In another solution audio fingerprints are extracted from audio streams and compared to find a match among all the audio streams when multiple cameras are recording the same event. By comparing the occurrence of similar sound matches, it may be possible to calculate the synchronization offset. However, this solution requires all the user devices 1, 2, 3 to be close enough to the event since the speed of sound is much slower than the speed of light. The sound, recorded by a user device 1, 2, 3 that is closer to the sound source, could be up to one second ahead as compared to the sound recorded by another user device 1, 2, 3, when watching a sport game in large stadium. Furthermore, the noise generated by the crowds would also decrease the accuracy of finding suitable audio fingerprints. This means that audio fingerprinting will generally not be very reliable to achieve video stream synchronization involving multiple user devices 1, 2, 3.

In a further solution external hardware synchronized cameras or so-called inter-camera synchronization is assumed. Such a solution requires physically connecting the cameras of the user devices 1, 2, 3 to external synchronization hardware. It is often used in professional live video production. However, in the social video streaming scenario, synchronizing all users' user devices 1, 2, 3 in a social event is not practical and nearly impossible.

In yet another solution timestamps are added to the video streams by having new features implemented in base stations in mobile communication networks. However, a problem is that not all user devices 1, 2, 3 are connected to the Internet via same network provider, and some of them may be connected via Wireless Local Area Network (WLAN) provided by the event organizer. In order to overcome such a problem, this solution has to access each base station and WLAN access provider, which introduces complicated management issues in heterogeneous networks and increases corresponding cost.

A further solution involves analyzing the incoming video streams, and monitoring the sequence of video frames for the occurrence of at least one of a plurality of different types of visual events. The occurrence of a selected visual event should be detected among all the video streams and taken as a marker to synchronize all video streams. However, this solution requires all user devices 1, 2, 3 recording at least one common visual event in order to find the marker among all the video streams from each user device 1, 2, 3. If the user devices 1, 2, 3 are focusing on different parts of the event, there is no way for this solution to identify the marker.

US 2011/0043691 discloses a method for synchronizing at least two video streams originating from at least two cameras having a common visual field. This solution requires studying trajectories of objects of a scene. It is not adapted for a situation where multiple users are filming at the same time but at different parts of an event.

There is therefore a need for an efficient solution to achieve synchronization of video streams originating from different user devices 1, 2, 3.

SUMMARY

It is a general objective to achieve video synchronization between video streams originating from different user devices.

This and other objectives are met by embodiments as disclosed herein.

An aspect of the embodiments relates to a video synchronization method comprising, for each user device of multiple user devices, transmitting a system clock reference over a wireless, short range communication channel to the user device. The system clock reference indicates a current time according to a system clock. The method also comprises wirelessly receiving a clock offset together with an identifier associated with the user device or with a user of the user device. The clock offset represents a difference between the clock reference and a corresponding current time according to an internal clock of the user device. The method further comprises storing the clock offset and the identifier in a memory and receiving a video stream of video frames together with the identifier over a wireless media channel from the user device. The method additionally comprises retrieving the clock offset from the memory using the identifier received together with the video frames and calculating a respective capture time according to the system clock for video frames in the video stream based on a respective timestamp tagged to the video frames and the retrieved clock offset. The method further comprises time aligning video streams from the multiple user devices based on the calculated respective capture times.

Another aspect of the embodiments relates to a method of enabling video synchronization. The method comprises a user device receiving a system clock reference over a wireless, short range communication channel. The system clock reference indicates a current time according to a system clock available at a video synchronization server system. The method also comprises the user device calculating a clock offset between the system clock reference and a corresponding current time according to an internal clock of the user device. The method further comprises the user device wirelessly transmitting the clock offset together with an identifier associated with the user device or with a user of the user device to the video synchronization server system. The method also comprises the user device tagging video frames with a respective timestamp representing a respective capture time, according to the internal clock, of the video frames by a camera of or connectable to the user device. The method additionally comprises the user device transmitting a video stream of the video frames together with the identifier to the video synchronization server system over a wireless media channel.

A further aspect of the embodiments relates to a method of enabling video synchronization comprising a user device receiving a system clock reference over a wireless, short range communication channel. The system clock reference indicates a current time according to a system clock available to a video synchronization server system. The method also comprises the user device calculating a clock offset between the system clock reference and a corresponding current time according to an internal clock of the user device. The method further comprises the user device tagging video frames with a respective timestamp representing a respective capture time, according to the internal clock, of the video frames by a camera of or connectable to the user device modified by the clock offset. The method additionally comprises the user device transmitting a video stream of the video frames to the video synchronization server system over a wireless media channel.

Yet another aspect of the embodiments relates to a video synchronization server system. The video synchronization server system is configured to transmit, for each user device of multiple user devices, a system clock reference over a wireless, short range communication channel to the user device. The system clock reference indicates a current time according to a system clock of the video synchronization server system. The video synchronization server system is also configured to wirelessly receive, for each user device of the multiple user devices, a clock offset together with an identifier associated with the user device or with a user of the user device. The clock offset represents a difference between the system clock reference and a corresponding current time according to an internal clock of the user device. The video synchronization server system is further configured to associatively store, for each user device of the multiple user devices, the clock offset and the identifier in a memory. The video synchronization server system is configured to receive, for each user device of the multiple user devices, a video stream of video frames together with the identifier over a wireless media channel from the user device. The video synchronization server system is also configured to retrieve, for each user device of the multiple user devices, the clock offset from the memory using the identifier received together with the video frames. The video synchronization server system is further configured to calculate, for each user device of the multiple user devices, a respective capture time according to the system clock for video frames in the video stream based on a respective timestamp tagged to the video frames and the retrieved clock offset. The video synchronization server system is additionally configured to time align video streams from the multiple user devices based on the calculated respective capture times.

A related aspect of the embodiments defines a video synchronization server system comprising a clock manager for providing, for each user device of multiple user devices, a system clock reference for transmission over a wireless, short range communication channel to the user device. The system clock reference indicates a current time according to a system clock of the video synchronization server system. The video synchronization server system also comprises a memory manager for associatively storing, for each user device of the multiple user devices and in a memory, a clock offset received from the user device together with an identifier associated with the user device or with a user of the user device. The clock offset represents a difference between the system clock reference and a corresponding current time according to an internal clock of the user device. The memory manager is also for retrieving, for each user device of the multiple user devices, the clock offset from the memory based on the identifier received over a wireless media channel from the user device together with a video stream of video frames. The video synchronization server system further comprises a calculator for calculating, for each user device of the multiple user devise, a respective capture time according to the system clock for video frames in the video stream based on a respective timestamp tagged to the video frames and the retrieved clock offset. The video synchronization server system additionally comprises a time aligner for time aligning video streams from the multiple user devices based on the calculated respective capture times.

A further aspect of the embodiments relates to a user device that is configured to receive a system clock reference over a wireless, short range communication channel. The system clock reference indicates a current time according to a system clock available to a video synchronization server system. The user device is also configured to calculate a clock offset between the system clock reference and a corresponding current time according to an internal clock of the user device. The user device is further configured to wirelessly transmit the clock offset together with an identifier associated with the user device or of a user of the user device to the video synchronization server system. The user device is also configured to tag video frames with a respective timestamp representing a respective capture time, according to the internal clock, of the video frames by a camera of or connectable to the user device. The user device is additionally configured to transmit a video stream of the video frames together with the identifier to the video synchronization server system over a wireless media channel.

A related aspect of the embodiments defines a user device comprising a calculator for calculating a clock offset between a system clock reference received over a wireless, short range communication channel and a corresponding current time according to an internal clock of the user device. The system clock reference indicates a current time according to a system clock available to a video synchronization server system. The user device also comprises an output unit for outputting the clock offset together with an identifier associated with the user device or with a user of the user device for wireless transmission to the video synchronization server system. The user device further comprises a tagging unit for tagging video frames with a respective timestamp representing a respective capture time, according to the internal clock, of the video frames by a camera of or connectable to the user device. The output unit is also for outputting a video stream of the video frames together with the identifier for transmission to the video synchronization server system over a wireless media channel.

Yet another aspect of the embodiments defines a user device that is configured to receive a system clock reference over a wireless, short range communication channel. The system clock reference indicates a current time according to a system clock available to a video synchronization server system. The user device is also configured to calculate a clock offset between the system clock reference and a corresponding current time according to an internal clock of the user device. The user device is further configured to tag video frames with a respective timestamp representing a respective capture time, according to the internal clock, of the video frames by a camera of or connectable to the user device modified by the clock offset. The user device is additionally configured to transmit a video stream of the video frames to the video synchronization server system over a wireless media channel.

A related aspect of the embodiments defines a user device comprising a calculator for calculating a clock offset between a system clock reference received over a wireless, short range communication channel and a corresponding current time according to an internal clock of the user device. The system clock reference indicates a current time according to a system clock available to a video synchronization server system. The user device also comprises a tagging unit for tagging video frames with a respective timestamp representing a respective capture time, according to the internal clock, of the video frames by a camera of or connectable to the user device modified by the clock offset. The user device further comprises an output unit for outputting a video stream of the video for transmission to the video synchronization server system over a wireless media channel.

An aspect of the embodiments relates to a computer program comprising instructions, which when executed by a processor, cause the processor to transmit, for each user device of multiple user devices, a system clock reference over a wireless, short range communication channel to the user device. The system clock reference indicates a current time according to a system clock. The processor is also caused to wirelessly receive, for each user device of the multiple user devices, a clock offset together with an identifier associated with the user device or with a user of the user device. The clock offset represents a difference between the system clock reference and a corresponding current time according to an internal clock of the user device. The processor is further caused to associatively store, for each user device of the multiple user devices, the clock offset and the identifier in a memory. The processor is additionally caused to receive, for each user device of the multiple user devices, a video stream of video frames together with the identifier over a wireless media channel from the user device. The processor is also caused to retrieve, for each user device of the multiple user devices, the clock offset from the memory using the identifier received together with the video frames. The processor is further caused to calculate, for each user device of the multiple user devices, a respective capture time according to the system clock for video frames in the video stream based on a respective timestamp tagged to the video frames and the retrieved clock offset. The processor is additionally caused to time align video streams from the multiple user devices based on the calculated respective capture times.

Another aspect of the embodiments relates to a computer program comprising instructions, which when executed by a processor, cause the processor to receive a system clock reference over a wireless, short range communication channel. The system clock reference indicates a current time according to a system clock available to a video synchronization server system. The processor is also caused to calculate a clock offset between the system clock reference and a corresponding current time according to an internal clock. The processor is further caused to wirelessly transmit the clock offset together with an identifier associated with a user device or with a user of the user device to the video synchronization server system. The processor is also caused to tag video frames with a respective timestamp representing a respective capture time, according to the internal clock, of the video frames by a camera of or connectable to the user device. The processor is additionally caused to transmit a video stream of the video frames together with the identifier to the video synchronization server system over a wireless media channel.

A further aspect of the embodiments relates to a computer program comprising instructions, which when executed by a processor, cause the processor to receive a system clock reference over a wireless, short range communication channel. The system clock reference indicates a current time according to a system clock available to a video synchronization server system. The processor is also caused to calculate a clock offset between the system clock reference and a corresponding current time according to an internal clock. The processor is further caused to tag video frames with a respective timestamp representing a respective capture time, according to the internal clock, of the video frames by a camera of or connectable to a user device modified by the clock offset. The processor is additionally caused to transmit a video stream of the video frames to the video synchronization server system over a wireless media channel.

A related aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present embodiments address problems that video frames originating from different user devices recording a scene are out-of-synchronization, for instance, in social media environments. The embodiments achieve a reliable and implementation friendly, i.e. low complexity, solution to synchronize video stream from multiple user devices.

BRIEF DESCRIPTION OF THE DRAWINGS

The embodiments, together with further objects and advantages thereof, may best be understood by making reference to the following description taken together with the accompanying drawings, in which:

FIG. 3 is a flow chart illustrating a video synchronization method according to an embodiment;

FIG. 4 is a flow chart illustrating an embodiment of receiving clock offset and identifier in FIG. 3;

FIG. 7 is a flow chart illustrating a method for enabling video synchronization according to another embodiment;

FIG. 9 schematically illustrates a block diagram of a video synchronization server system according to an embodiment;

FIG. 14 schematically illustrates a block diagram of a user device according to a further embodiment;

FIG. 15 schematically illustrates a block diagram of a user device according to yet another embodiment;

DETAILED DESCRIPTION

Figure 1:
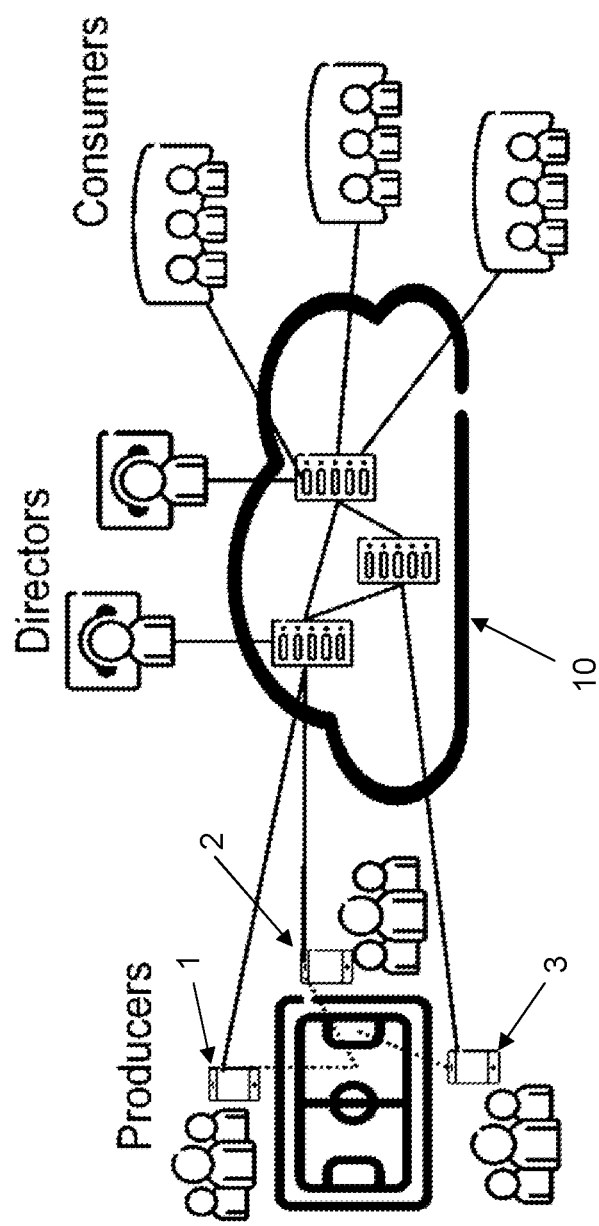
FIG. 1 illustrates social video streaming of a sports event.
Figure 2:
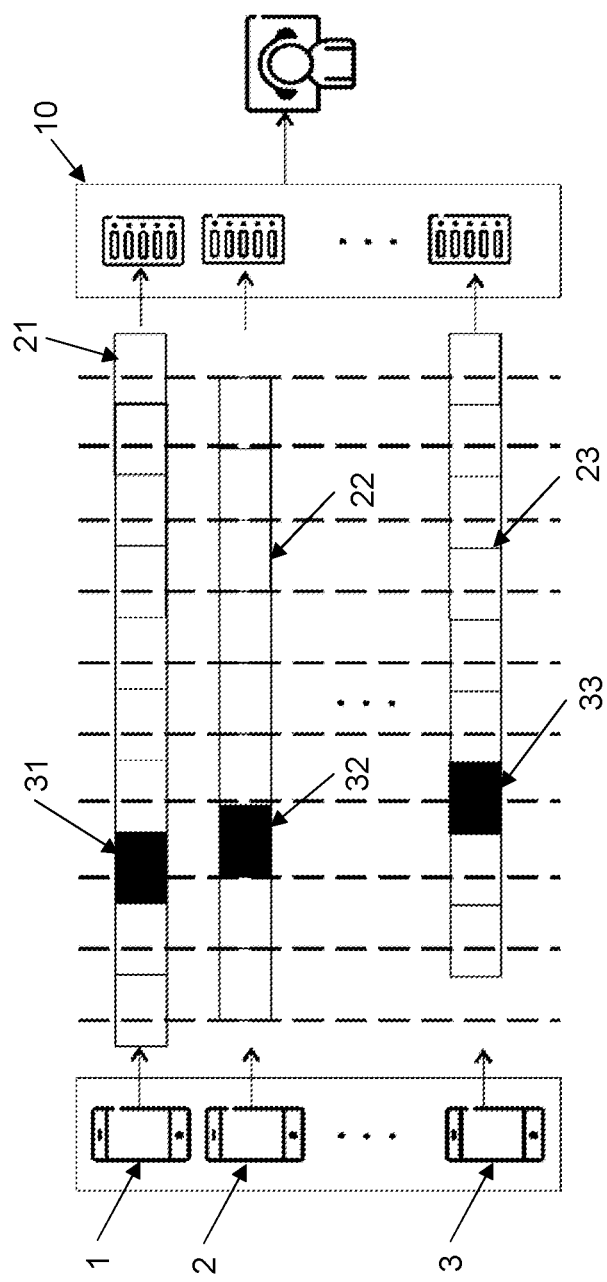
FIG. 2 schematically illustrates lack of synchronization of video streams sent from multiple user devices.

Throughout the drawings, the same reference numbers are used for similar or corresponding elements.

The present embodiments generally relate to video stream synchronization, and in particular to synchronization of video streams originating from multiple user devices recording a scene.

The embodiments thereby enable video frame synchronization for video streaming of multiple user devices, for instance, in connection with a social event, such as a game or concert. As a consequence of the video stream synchronization it is possible to conduct video direction and rich-content assertion by providing video of the event from different viewpoints corresponding to the users' positions relative to the recorded scene.

In the following, a video frame is used to denote a picture or image of a video stream. Hence, a video frame could alternatively be denoted (video) picture or (video) image in the art. As is known in the art of video coding, a video frame is encoded according to a video coding standard to get an encoded video frame, such as an intra-coded frame, or I frame or picture, or an inter-coded frame, or P or B frame or picture.

FIG. 3 is a flow chart illustrating a video synchronization method according to the embodiment. The steps S1 to S6 as shown in the figure are performed for each user device of multiple user devices, which is schematically indicated by the hatched line. The method starts in step S1 comprising transmitting a system clock reference over a wireless, short range communication channel to the user device. The system clock reference indicates a current time according to a system clock. The following step S2 comprises wirelessly receiving a clock offset together with an identifier associated with the user device or with a user of the user device. The clock offset represents a difference between the clock reference and a corresponding current time according to an internal clock of the user device. The method also comprises storing the clock offset and the identifier in a memory in step S3. Step S4 comprises receiving a video stream of video frames together with the identifier over a wireless media channel from the user device. The clock offset is retrieved from the memory in step S5 using the identifier received together with the video frames. The following step S6 comprises calculating a respective capture time according to the system clock for video frames in the video stream based on a respective timestamp tagged to the video frames and the clock offset retrieved in step S5. The method further comprises time aligning, in step S7, video streams from the multiple user devices based on the respective capture times calculated in step S6.

The video synchronization method thereby involves wirelessly communicating a respective system clock reference to each user device over a wireless, short range communication channel. The user devices return a respective clock offset together with the identifier. The clock offsets can then be used to compensate for any offset and difference between the time as defined by the system clock and the time as defined by the respective internal clocks of the user devices. Hence, once video frames of a video stream are received from a user device and tagged with timestamps generated according to the internal clock of the user device, the clock offset can be retrieved from the memory and used to calculate a respective capture time according to the system clock. Hence, each video stream from the different user devices can thereby be assigned capture times according to the system clock, i.e. capture times defined in the system time reference. The assigned capture times are used to time align the video streams and the video frames from the multiple user devices.

The wireless, short range communication channel used to transmit the system clock references to the user devices should be a communication channel of low or substantially no transmission delay. This can be achieved by using a wireless, short range communication channel, i.e. requiring no access network to transmit the system clock references to the user devices. A currently preferred technology to use in step S1 is visual light communication (VLC). In such a case, step S1 of FIG. 3 comprises transmitting the system clock reference as a VLC signal detectable by a camera of or connectable to the user device.

VLC is a data communications medium using visible light between 400 and 800 THz. VLC can achieve high bitrates up to several hundreds of Mbit/s. Generally, the VLC signal could be transmitted using a fluorescent lamp or preferably a light-emitting diode (LED). The VLC signal from, preferably, the LED or lamp can then be detected by a camera of or connectable to the user device. Hence, with such a communication technology the VLC signal transmitter could be in the form of a LED or lamp and the VLC signal receiver is the camera. VLC communication is standardized within IEEE Wireless Personal Area Networks working group 802.15.

Although VLC is a preferred communication technology to transmit the system clock references, other wireless, short range communication technologies with low delay could alternatively be used. Non-limiting examples of such other communication technologies include Bluetooth®, near-field communication (NFC)—a form of short-range wireless communication where the antenna used is much smaller than the wavelength of the carrier signal, inductive communication, etc.

The transmission of the system clock reference, preferably in the form of a VLC signal, in step S1 may be performed in connection with user registration or access to a social event. For instance, the user device has access to an event ticket that can be displayed on its screen. In such a case, the user shows the screen for a reader or scanner when entering the social event in order to read the displayed event ticket. In such a case, the VLC signal can be sent from the reader or scanner or a VLC transmitter (lamp or LED) arranged in connection with the reader or scanner to be captured by the camera of or connectable to the user device.

Hence, step S1 comprises, in an embodiment, transmitting the system clock reference as the VLC signal in connection with reading an event ticket displayed on a screen of the user device.

This means that a single procedure can be used to both verify access of the user to the social event, such as game or concert, and transmit the system clock reference to the user device. Thus, while the screen of the user device presents the event ticket to the reader or scanner the camera of or connectable to the user device detects the VLC signal carrying or defining the system clock reference.

The wireless reception of the clock offset and the identifier in step S2 could also be based on VLC communication as an embodiment of step S1. In such a case, step S2 comprises receiving the clock offset together with the identifier as a VLC signal.

FIG. 4 is a flow chart illustrating an embodiment of step S2 that uses VLC communication for wirelessly receiving the clock offset. The method continues from step S1 in FIG. 3. A next step S10 comprises reading an event ticket defining the identifier on a screen of the user device. Step S11 comprises detecting a VLC signal representing the clock offset and generated by the screen of the user device.

Thus, the screen of the user device displays an event ticket defining the identifier of the user device or of its user. The event ticket is read to thereby get access to the identifier. In addition, the screen of the user device is activated to send a VLC signal that is detected by the reader or scanner and where this VLC signal defines the clock offset.

In an alternative approach, a lamp, such as flash, of the user device is activated to transmit the VLC signal defining the clock offset.

Hence, in a particular embodiment the user displays the event ticket on the screen of his/her user device to a reader or scanner. At the same time a lamp or LED transmits a VLC signal defining the system clock reference. The camera of or connectable to the user device detects this VLC signal. The user device calculates a difference between the system clock reference and the current time as defined by its internal clock to get the clock offset. This clock offset is returned to the reader or scanner in the form of a VLC signal, such as by using the screen of the user device, or more correctly the lightning of the screen, or a lamp or flash of the user device as VLC transmitter. The reader or scanner thereby gets access to the clock offset together with the identifier.

The received clock offset and identifier are then associatively stored in the memory in the following step S3 of FIG. 3. Associatively storing the clock offset and the identifier in step S3 comprises storing the clock offset in the memory together with the identifier to enable retrieval of the clock offset from the memory using the identifier.

For instance, the clock offsets and identifiers received from the user devices could be stored in a look-up table listing, for each identifier, the clock offset received from the user device associated with the identifier. In such a case, the clock offset can then be retrieved from the look-up table using the identifier as table input.

Generally, the clock offset and the identifier can be associatively stored in step S3 in any suitable manner that enables retrieval of the clock offset using the identifier.

The user then starts to film the social event using the camera of or connectable to the user device thereby producing a respective video stream of (encoded) video frames. The video frames of the video stream are transmitted from the user device over the wireless media channel and then received together with the identifier in step S4. For instance, the encoded video frames could be sent as a stream of data packets carrying the encoded video data. In such a case, the data packets could be marked with the identifier of the user device or of the user. In an alternative approach, the identifier is provided in connection with setting up the wireless media channel and the streaming session. Then there is generally no need to transmit the identifier together with each data packet.

In either case, the identifier received together with the video stream in step S4 is used in step S5 to access the previously (in step S3) stored clock offset from the memory. Each video frame of the video stream or at least a portion of the video frames preferably has a timestamp representing a capture time of the particular video frame, picture or image by the camera of or connectable to the user device. This capture time is defined according to the internal clock of the user device. The clock offset retrieved in step S5 can thereby be used to calculate a respective capture time according to the system clock, i.e. according to a system time reference, instead of according to the internal clock of the user device, i.e. instead of according to a time reference of the user device. Hence, the timestamps according to the internal clock are mapped into corresponding capture times defined according to the system clock using the retrieved clock offset.

In a particular embodiment, the calculation performed in step S6 could be in the form of $t_S = t_I + \Delta t_C$, wherein $t_I$ is the capture time of a video frame according to the internal clock of the user device, i.e. corresponds to the timestamp of the video frame, $\Delta t_C$ represents the clock offset and $t_S$ represents the calculated capture time of the video frame according to the system clock.

The calculation performed in step S6 could be made for each video frame of the video stream. In such a case, each received video frame will have a respective capture time according to the system clock. However, for the purpose of time aligning video streams from multiple user devices it is not absolutely necessary to perform the calculation of capture time in step S6 for each and every video frame of the video streams. Generally, it is sufficient if at least one video frame per video stream is assigned a capture time according to the system clock if the frame rate of the video stream is known. In such a case, it is possible to calculate respective capture times for the other video frames of the video stream using the at least one calculated capture time from step S6 and the frame rate.

In an embodiment, step S7 of FIG. 3 comprises time aligning the video streams from the multiple user devices based on the calculated respective capture times so that video frames in the video streams having a same capture time are time aligned.

Thus, an embodiment uses VLC to synchronize clock reference between a directors network and producers in the form of user devices and maps the clock offset of the user devices with an identifier. The identifier can, for instance, be a ticket for an event or any alternative user identification like social network account. That identifier can be at a same time used to register user into the collaboration network. The VLC source is provided by the social event organizer and the system clock reference can be embedded into a VLC signal. When a user enters a gate where tickets are scanned, the camera of the user device can capture the VLC signal. Using its own internal clock, the user device can calculate a clock offset or difference between the system clock and the internal clock. The system clock reference provided by the VLC source is preferably synchronized with a centralized system clock through a local, dedicated wired network not affected by the other heavy traffic generated by the users. The VLC communication with the user devices is preferably independent on any other wireless network used at the site as well as on public access network conditions. That communication is localized at VLC points and the data exchange is short-range so sharing system clock references can be exchanged with a minimal delay.

The provision of the clock reference enables synchronization of the video streams transmitted from the user devices using the most efficient stream synchronization solution, i.e. "clock synchronization" (see Kaheel et al., Mobicast: A system for Collaborative Event Casting Using Mobile Phones, 2009, In Proceeding MUM '09 Proceedings of the 8th International Conference on Mobile and Ubiquitous Multimedia, Article No. 7), using timestamps generated by the internal clocks of the user devices combined with the clock offsets registered in connection with reading tickets for the event.

Figure 8:
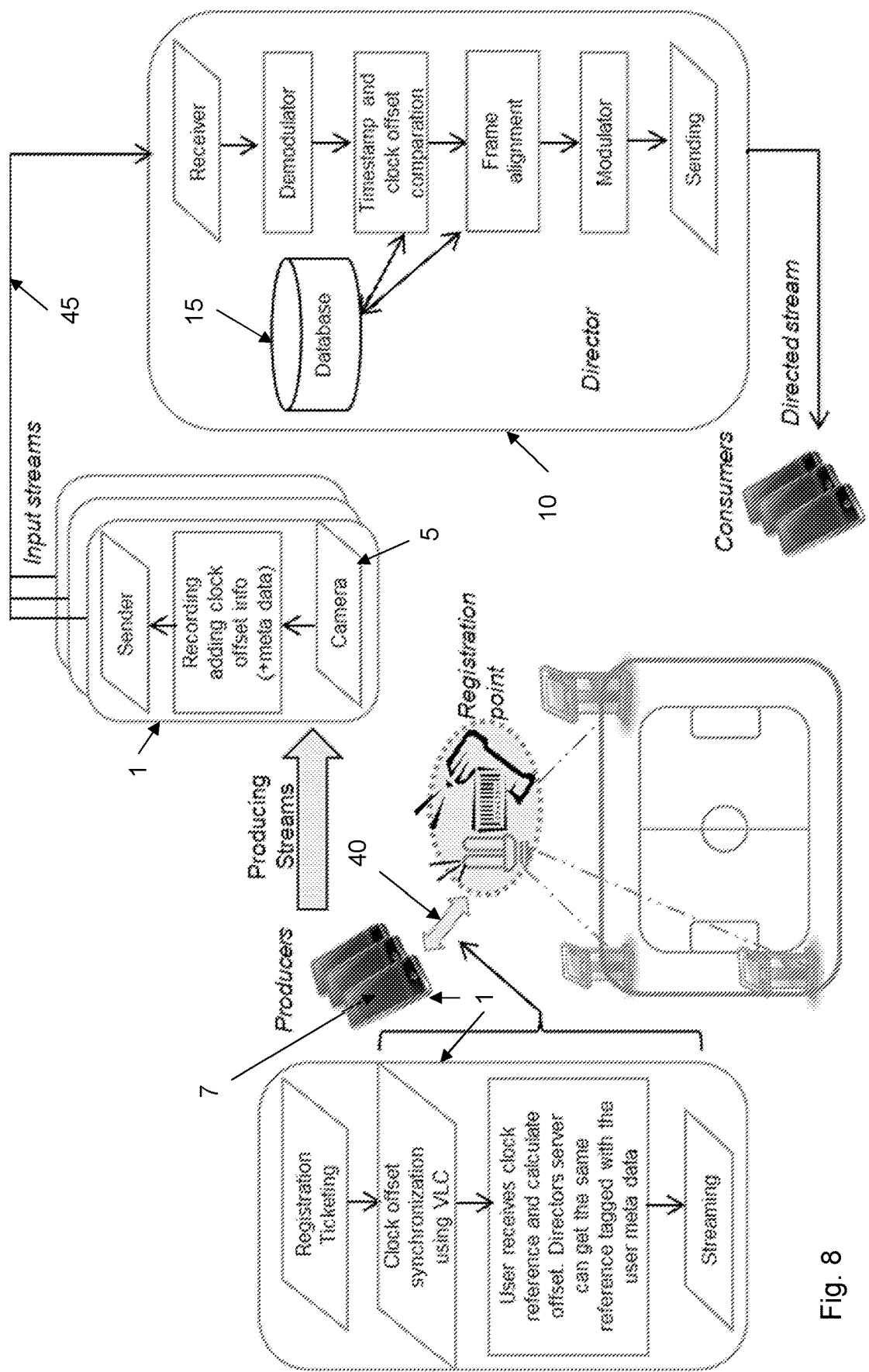
FIG. 8 schematically illustrates a system comprising a user device and a video synchronization server system and the operation flow in order to achieve synchronization of video streams according to an embodiment.

Thus, as shown on the left side of FIG. 8 illustrating a system comprising a user device 1 and a video synchronization server system 10, video stream synchronization starts with the user device registration. While the user's ticket is read, e.g. scanned, the user device 1 is exposed also to the VLC source which embeds the system clock reference and exchanges it via the VLC signal over a wireless, short range light-based communication channel 40. The VLC signal defining the system clock reference is captured by the camera 5 of the user device 1 and is used for the calculation of the clock offset. The system clock reference transmitted by VLC source can be synchronized with a system clock of the video synchronization server system 10 through a local dedicated wired network not affected by the other heavy traffic generated by the users. The calculated clock offset can be exchanged back to the video synchronization server system 10 using the screen 7 of the user device 1 and the VLC reader and is then stored together with user's identifier used for the registration. At that stage the user is ready to provide a video stream of the event captured with camera 5 of the user device 1.

In the next phase as shown in the middle section of FIG. 8, the user device 1 produces a video stream of video frames that is transmitted over a wireless media channel 45 towards the receiving video synchronization server system 10 including the identifier.

The video synchronization server system 10 receives and decodes the video stream as shown on the right side of FIG. 8. The video synchronization server system 10 can now easily use the most efficient stream synchronization solution "clock synchronization" and use timestamps generated by the internal clocks of the user devices 1 combined with the clock offsets registered in the initial step. Once the video streams from multiple user devices 1 are synchronized with aligned video frames the video synchronization server system 10 can generate directed video streams and provide them for consumers.

The present embodiments address the problem that internal clocks of user devices are out-of-synchronization in social media environment. Such lack of synchronization makes it very difficult to synchronize video streams from different user devices on the backend side.

Compared to existing solutions, using VLC to enable retrieval of clock offset from the user devices already in the event registration phase simplify video stream synchronization. Even better, the most efficient synchronization solution, "clock synchronization", that relies on timestamp exchange together with clock offsets, can be now used without need for the additional expensive video analytics. The proposed synchronization is a reliable and low cost solution, which can provide adequate synchronization for the video synchronization server system to view fully synchronized video streams from multiple sources via different transmission technologies. The solution uses, in an embodiment, VLC-capable source LED lights and receivers that can be easily combined with the user's registration for the event. Such an embodiment can use existing cameras and screens of the user devices to enable reception and transmission of VLC signals.

Usage of an identifier provided on the event ticket, such as ticket number, not only simplifies the video synchronization procedure since no dedicated identifiers need to be communicated. The identifier can also be used as meta-data, such as in the form of position information of the user device during the event, such as the position of the user device relative to the game field or a stage.

For instance, the ticket number not only works as identifier of the user or its user device but also provides information of where the user will be sitting or is placed during the event. Hence, the ticket number can also be used as position information of the source of the video producing equipment, i.e. user device, relative to the recorded scene, e.g. game field or stage. Such position information can then be used when selecting which video streams to mix together to form a collaborative video stream that can be provided to consumers.

Figure 5:
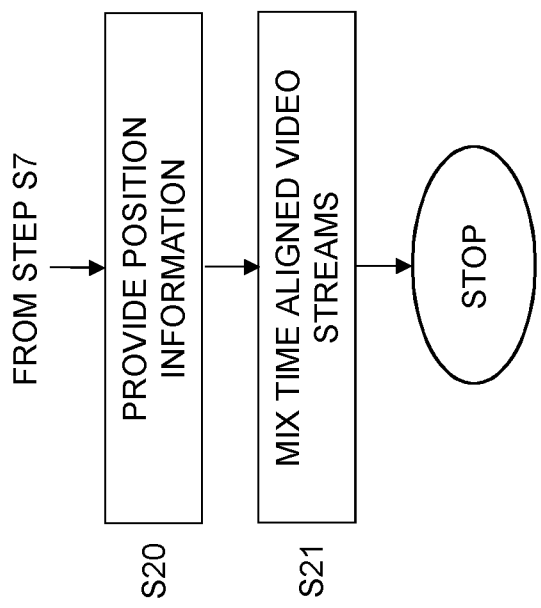
FIG. 5 is a flow chart illustrating additional, optional steps of the method illustrated in FIG. 3.

FIG. 5 is a flow chart illustrating additional steps of the method in FIG. 3 when using position information. The method continues from step S7 in FIG. 3. A next step S20 comprises providing respective position information of the multiple user devices based on the identifiers defined by the event tickets. A next step S21 comprises mixing time aligned video streams from the user devices based on the position information.

Thus, in this case position information, such as relative position of the user devices relative to the recorded scene, e.g. game field or stage, can be obtained based on the particular identifier defined by the event ticket, such as ticket number. This enables selecting which time aligned video streams to mix or combine depending on from which positions the scenes were recorded.

For instance, the mixing in step S21 can comprise selecting time aligned video streams recorded at defined sections or positions in a stadium, such as from a same section or from different sections, mixing the selected and time aligned video streams.

In an alternative approach dedicated position information could be provided, for instance, when using another type of identifier than ticket number. The position information could then be GPS coordinates or position coordinates provided by the user device together with the video stream and the identifier.

The identifier provided in steps S2 and S4 of FIG. 3 and used in step S5 does not necessarily have to be an identifier defined by an event ticket. Also other types of identifiers associated with the user device or with the user of the user device could alternatively be used, such as device serial number, social media identifier or user name, etc.

Figure 6:
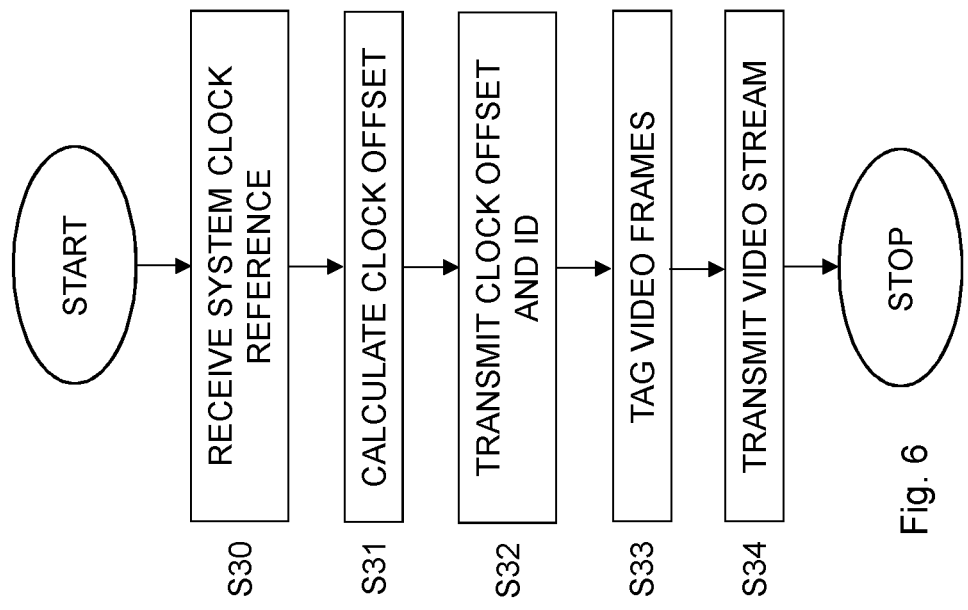
FIG. 6 is a flow chart illustrating a method for enabling video synchronization according to an embodiment.

FIG. 6 is a flow chart illustrating a method of enabling video synchronization according to an embodiment. The method starts in step S30, which comprises a user device receiving a system clock reference over a wireless, short range communication channel. The system clock reference indicates a current time according to a system clock available at a video synchronization server system. The user device then calculates, in step S31, a clock offset between the system clock reference and a corresponding current time according to an internal clock of the user device. The clock offset is wirelessly transmitted by the user device in step S32 together with an identifier associated with the user device or with a user of the user device to the video synchronization server system. In a next step S33 the user device tags video frames with a respective timestamp representing a respective capture time, according to the internal clock, of the video frames by a camera of or connectable to the user device. The following step S34 comprises the user device transmitting a video stream of the video frames together with the identifier to the video synchronization server system over a wireless media channel.

The method as shown in FIG. 6 thereby corresponds to the operations performed in the user device in order to enable synchronization, at the video synchronization server system, of the video stream produced by the user device with corresponding video streams produced by other user devices recording a similar scene, such as social event, as the current user.

Step S30 of FIG. 6 comprises the user device receiving the system clock reference as a VLC signal detectable by the camera of or connectable to the user device. Furthermore, the user device receives the system clock reference as the VLC signal in connection with displaying an event ticket on a screen of the user device.

Although VLC communication is a preferred embodiment of wireless, short range communication technology other low-delay, short range communication technologies that do not require any access network could alternatively be used as previously disclosed herein.

The calculation of the clock offset in step S31 comprises calculating a difference between the time as indicated by the received system clock reference and the time of the internal clock of the user device when the user device received the system clock reference in step S30. Hence, the reception of the system clock reference in step S30 triggers the user device to read its internal clock to get a current time representing the reception time of the system clock reference. The clock offset is then determined based on, preferably equal to, the difference between the time according to the system clock and the time according to the internal clock.

The transmitter of the system clock reference over the wireless, short range communication channel, e.g. the ticket reader or scanner, has access to the system clock, typically provided in a central location at the video synchronization server system, via a wired connection that enables transmission of the system clock reference without any substantial delays to the ticket reader or scanner. Hence, the point in time when the user device receives the system clock reference in step S30 substantially represents the current time according to the system clock since any transmission delays on the wired connection between the system clock and the ticket reader or scanner and on the wireless, short range communication channel between the ticket reader or scanner and the user device are very small and negligible.

The user device then transmits the clock offset and the identifier towards the video synchronization server system. In a particular embodiment, step S32 comprises the user device wirelessly transmitting the clock offset together with the identifier as a VLC signal. For instance, a screen of the user device could display an event ticket that defines the identifier, such as in the form of ticket number. The screen may in addition be lightened up to transmit the VLC signal representing the clock offset calculated in step S31.

The transmission of the clock offset and identifier in step S32 is not delay critical. Hence, it could be possible for the user device to transmit this data using another type of communication channel than the wireless, short range communication channel, such as VLC channel. For instance, the transmission in step S32 can be conducted over a wireless local area network (WLAN) or a mobile or cellular communication network.

In an embodiment of step S33, the user device tags or stamps video frames as they are output from the camera or, preferably, output from an encoder that encodes the video frames from the camera into encoded video frames. Thus, the video frames are tagged with a respective timestamp indicating the capture time according to the internal clock of the user device when the camera recorded a scene to produce the video frames.

In an embodiment, each video frame of the video stream is tagged with a respective timestamp in step S33. In another embodiment, not all video frames of the video stream need to be tagged if information of the frame rate is provided together with the video stream to the video synchronization server system. In this case, the video synchronization server system can use the frame rate together with the tagged video frames in order to estimate the capture times, according to the internal clock of the user device, of other video frames in the video stream.

The transmission of the video stream together with the identifier in step S34 over the wireless media channel is preferably conducted over a WLAN or a mobile or cellular communication network. The identifier could be included in each data packet transmitted over the wireless media channel and carrying encoded video frames of the video stream. Alternatively, the identifier could be transmitted once or a few times for the video stream, such as in connection with setting up the wireless media channel to the video synchronization server system.

In the above described embodiments, the user device calculates a clock offset that is communicated to the video synchronization server system. The clock offset can then be used to recalculate the capture times according to the internal clock of the user device of video frames transmitted by the user device to capture times according to the system clock of the video synchronization server system. In an alternative embodiment, the user device performs such a recalculation using the clock offset. Such an embodiment is shown in FIG. 7.

Hence, FIG. 7 is a flow chart illustrating a method of enabling video synchronization according to another embodiment. The method starts in step S40, which comprises a user device receiving a system clock reference over a wireless, short range communication channel. The system clock reference indicates a current time according to a system clock available to a video synchronization server system. A next step S41 comprises the user device calculating a clock offset between the system clock reference and a corresponding current time according to an internal clock of the user device. The user device then tags, in step S42, video frames with a respective timestamp representing a respective capture time, according to the internal clock, of the video frames by a camera of or connectable to the user device modified by the clock offset. In the following step S43 the user device transmits a video stream of the video frames to the video synchronization server system over a wireless media channel.

Steps S40 and S41 of FIG. 7 basically correspond to steps S30 and S31 of FIG. 6. Hence, in an embodiment the system clock reference is received as a VLC signal detectable by the camera of or connectable to the user device and in connection with displaying an event ticket on a screen of the user device.

Step S42 of FIG. 7, however, differs from the tagging performed in step S33 of FIG. 6 by tagging the video frames with a respective timestamp representing a respective capture time according to the internal clock modified by the clock offset calculated in step S41. As a consequence, the timestamps will thereby, due to the modification using the clock offset, represent the respective capture times according to the system clock and not the internal clock.

In a particular embodiment, the modification using the clock offset could be in the form of adding the clock offset calculated in step S41 to the capture time according to the internal clock in order to get the corresponding capture time according to the system clock. Thus, $t_S = t_I + \Delta t_C$, wherein $t_I$ is the capture time of a video frame according to the internal clock of the user device, $\Delta t_C$ represents the clock offset and $t_S$ represents the calculated capture time of the video frame according to the system clock.

The tagging of video frames in step S42 could be performed for all video frames of the video stream. Alternatively, the tagging with timestamps is performed only for a subset of the video frames. In the latter case, information of the frame rate is preferably transmitted together with the video frames in step S43 in order to enable, at the video synchronization server system, calculation of capture times according to the system clock also for those video frames that are not tagged with timestamps in step S42.

In the embodiment as shown in FIG. 7 no transmission of clock offset or identifier is needed in order to enable synchronization of video streams. In clear contrast, the user device itself produces a video stream with video frames that are timestamped according to the system clock by using the system clock reference received in step S40 to calculate the clock offset in step S41 and using this clock offset in step S42 to map or convert capture times of video frames from the internal clock to the system clock.

Another aspect of the embodiments relates to a video synchronization server system. The video synchronization server system is configured to transmit, for each user device of multiple user devices, a system clock reference over a wireless, short range communication channel to the user device. The system clock reference indicates a current time according to a system clock of the video synchronization server system. The video synchronization server system is also configured to wirelessly receive, for each user device of the multiple user devices, a clock offset together with an identifier associated with the user device or with a user of the user device. The clock offset represents a difference between the system clock reference and a corresponding current time according to an internal clock of the user device. The video synchronization server system is further configured to associatively store, for each user device of the multiple user devices, the clock offset and the identifier in a memory. The video synchronization server system is configured to receive, for each user device of the multiple user devices, a video stream of video frames together with the identifier over a wireless media channel from the user device. The video synchronization server system is also configured to retrieve, for each user device of the multiple user devices, the clock offset from the memory using the identifier received together with the video frames. The video synchronization server system is further configured to calculate, for each user device of the multiple user devices, a respective capture time according to the system clock for video frames in the video stream based on a respective timestamp tagged to the video frames and the retrieved clock offset. The video synchronization server system is additionally configured to time align video streams from the multiple user devices based on the calculated respective capture times.

In an embodiment, the video synchronization server system is configured to transmit, for each user device of the multiple user devices, the system clock reference as a VLC signal detectable by a camera of or connectable to the user device. In a particular embodiment, the video synchronization server system is configured to transmit, for each user device of the multiple user devices, the system clock reference as the VLC signal in connection with reading an event ticket displayed on a screen of the user device.

In an embodiment, the video synchronization server system is configured to receive, for each user device of the multiple user devices, the clock offset together with the identifier as a VLC signal.

In an embodiment, the video synchronization server system is configured to read, for each user device of the multiple user devices, an event ticket defining the identifier on a screen of the user device. The video synchronization server system is also configured to detect, for each user device of the multiple user devices, a VLC signal representing the clock offset and generated by the screen of the user device.

In an embodiment, the video synchronization server system is configured to store, for each user device of the multiple user devices, the clock offset in a memory together with the identifier to enable retrieval of the clock offset from the memory using the identifier.

In an embodiment, the video synchronization server system is configured to time align the video streams from the multiple user devices based on the calculated respective capture times so that video frames in the video streams having a same capture time are time aligned.

In an embodiment, the video synchronization server system is configured to provide respective position information of user devices of the multiple user devices based on the identifiers defined by the event tickets. The video synchronization server system is also configured to mix time aligned video streams from the user devices based on the position information.

The video synchronization server system could be a backend server capable of communicating with user devices. The video synchronization server system could alternatively be implemented as a group or cluster of multiple, i.e. at least two, backend servers that are interconnected by wired or wireless connections. The multiple backend servers could be locally arranged at the video synchronization service provider or be distributed among multiple locations. Also cloud-based implementations of the video synchronization server system are possible and within the scope of the embodiments. In an embodiment, the video synchronization server system preferably has wired connections from its system clock to the respective VLC sources (transmitters for the wireless, short range communication channel) used to transmit the system clock reference.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 9 illustrates a particular hardware implementation of the video synchronization server system 100. In an embodiment, the video synchronization server system 100 comprises a transmitter 110 configured to transmit the system clock reference and a first receiver 120 configured to wirelessly receive the clock offset together with the identifier. The video synchronization server system 100 also comprise a memory manager 130 configured to associatively store the clock offset and the identifier in a memory 15 and to retrieve the clock offset from the memory 15. A second receiver 140 of the video synchronization server system 100 is configured to receive the video stream of video frames together with the identifier. The video synchronization server system 100 further comprises a calculator 150 configured to calculate the respective capture time and a time aligner 160 configured to time align the video streams.

In the embodiment as shown in FIG. 9 the video synchronization server system 100 comprises two receivers 120, 140, wherein the first receiver 120 is configured to receive the clock offset and the identifier and the second receiver 140 is configured to receive the video stream. The first receiver 120 is preferably configured to receive and detect a VLC signal, whereas the second receiver 140 is preferably configured to receive the video stream in the form of data packets transmitted over the wireless media channel, such as over a WLAN or mobile or cellular communication network. The first receiver 120 could therefore be in the form of a photodiode, camera, scanner or reader configured to detect light signals. The transmitter 110 is preferably configured to transmit the system clock reference as a VLC signal. Hence, the transmitter 110 could be in the form of a lamp or LED.

The transmitter 110 is preferably connected to, preferably with a wired connection, to a system clock 17 to retrieve the system clock reference therefrom. The first receiver 120 is connected to the memory manager 130 to forward the received clock offset and identifier thereto for storage in the connected memory 15. The memory manager 130 is also connected to the second receiver 140 to get the identifier therefrom transmitted in connection with the video stream. The memory manager 130 retrieves the clock offset from the memory 15 and outputs it to the connected calculator 150. This calculator 150 is also connected to the second receiver 140 in order to receive the timestamps tagged to video frames. The calculator 150 outputs calculated capture times according to the system clock to the connected time aligner 160, which thereby can use the calculated capture times to time align video streams from multiple user devices.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 10:
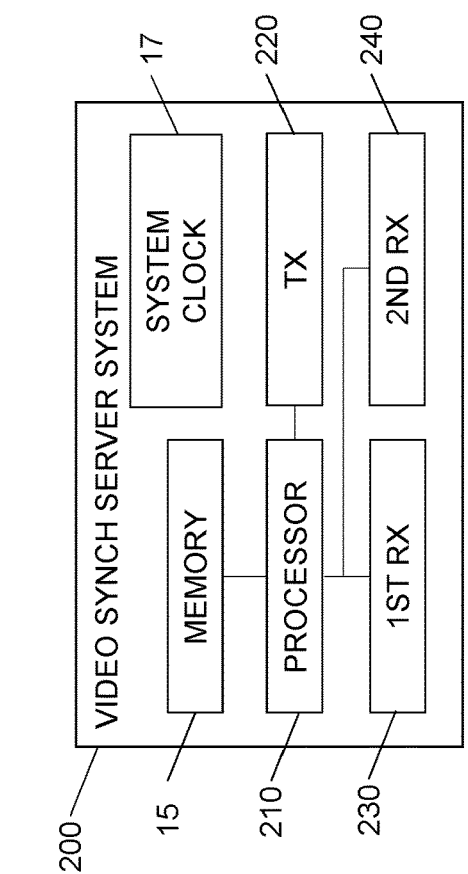
FIG. 10 schematically illustrates a block diagram of a video synchronization server system according to another embodiment.

In a particular example, the video synchronization server system 200, see FIG. 10, comprises a processor 210 and a memory 15 comprising instructions executable by the processor 210. The processor 210 is operative to cause a transmitter 220 to transmit the system clock reference and a first receiver 230 to wirelessly receive the clock offset together with the identifier. The processor 210 is also operative to associatively store the clock offset and the identifier in the memory 15 and retrieve the clock offset from the memory 15. The processor 210 is further operative to cause a second receiver 240 to receive the video stream of video frames together with the identifier. The processor 210 is additionally operative to calculate the respective capture time and to time align the video streams.

In a particular embodiment, the processor 210 is operative, when executing the instructions stored in the memory 15, to perform the above described operations. The processor 210 is thereby interconnected to the memory 15 to enable normal software execution.

In addition to the first and second receivers 230, 240 and the transmitter 220, which may be implemented as discussed in the foregoing in connection with FIG. 9, the video synchronization server system 200 also comprises the system clock 17.

Figure 17:
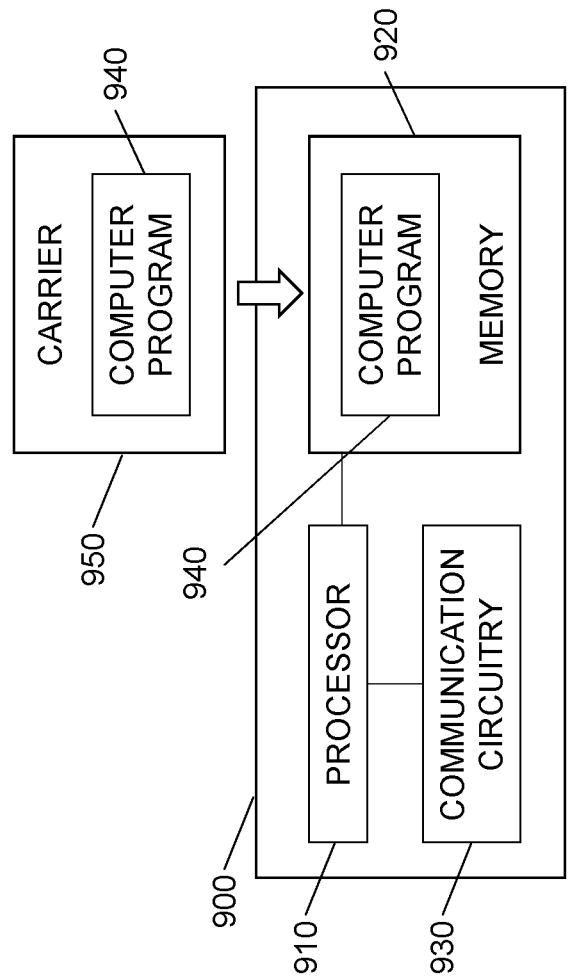
FIG. 17 schematically illustrates a computer program implementation according to an embodiment.

FIG. 17 is, in an embodiment, a schematic block diagram illustrating an example of a video synchronization server system 900 comprising a processor 910, an associated memory 920 and a communication circuitry 930.

In this particular example, at least some of the steps, functions, procedures, modules and/or blocks described herein are implemented in a computer program 940, which is loaded into the memory 920 for execution by processing circuitry including one or more processors 910. The processor 910 and memory 920 are interconnected to each other to enable normal software execution. A communication circuitry 930 is also interconnected to the processor 910 and/or the memory 920 to enable input and/or output of system clock reference, identifier, clock offset and video frames.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 940 comprises instructions, which when executed by the processor 910, cause the processor 910 to transmit, for each user device of multiple user devices, a system clock reference over a wireless, short range communication channel to the user device. The system clock reference indicates a current time according to a system clock. The processor 910 is also caused to wirelessly receive, for each user device of the multiple user devices, a clock offset together with an identifier associated with the user device or with a user of the user device. The clock offset represents a difference between the system clock reference and a corresponding current time according to an internal clock of the user device. The processor 910 is further caused to associatively store, for each user device of the multiple user devices, the clock offset and the identifier in a memory 920. The processor 910 is additionally caused to receive, for each user device of the multiple user devices, a video stream of video frames together with the identifier over a wireless media channel from the user device. The processor 910 is also caused to retrieve, for each user device of the multiple user devices, the clock offset from the memory 920 using the identifier received together with the video frames. The processor 910 is further caused to calculate, for each user device of the multiple user devices, a respective capture time according to the system clock for video frames in the video stream based on a respective timestamp tagged to the video frames and the retrieved clock offset. The processor 910 is additionally caused to time align video streams from the multiple user devices based on the calculated respective capture times.

The proposed technology also provides a carrier 950 comprising the computer program 940. The carrier 950 is one of an electronic signal, an optical signal, an electromagnetic signal, a magnetic signal, an electric signal, a radio signal, a microwave signal, or a computer-readable storage medium 950.

By way of example, the software or computer program 940 may be realized as a computer program product, which is normally carried or stored on a computer-readable medium 950, preferably non-volatile computer-readable storage medium 950. The computer-readable medium 950 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 940 may thus be loaded into the operating memory 920 of a computer or equivalent processing device, represented by the video synchronization server system 900 in FIG. 17, for execution by the processor 910 thereof.

The flow diagram or diagrams presented herein may therefore be regarded as a computer flow diagram or diagrams, when performed by one or more processors. A corresponding video synchronization server system may be defined as a group of function modules, where each step performed by the processor corresponds to a function module. In this case, the function modules are implemented as a computer program running on the processor. Hence, the video synchronization server system may alternatively be defined as a group of function modules, where the function modules are implemented as a computer program running on at least one processor.

Figure 11:
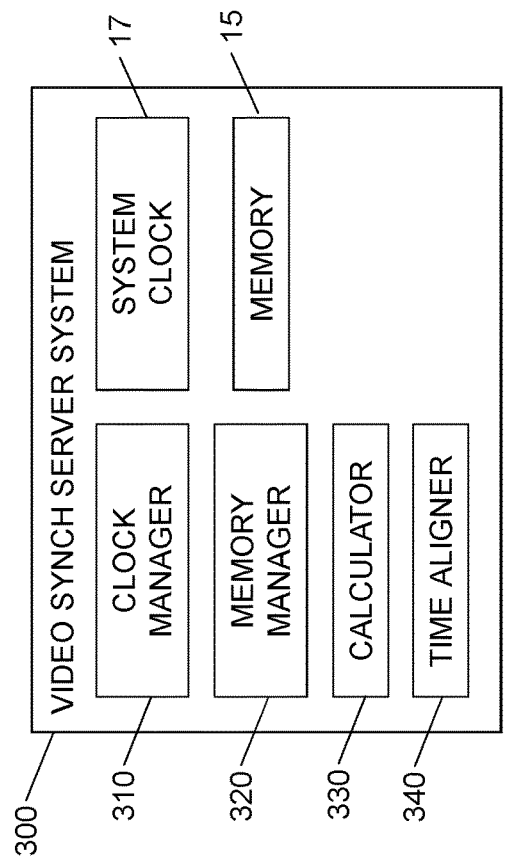
FIG. 11 schematically illustrates a block diagram of a video synchronization server system according to a further embodiment.

The computer program residing in memory may thus be organized as appropriate function modules configured to perform, when executed by the processor, at least part of the steps and/or tasks described herein. An example of such function modules is illustrated in FIG. 11 illustrating a schematic block diagram of a video synchronization server system 300 with function modules. The video synchronization server system 300 comprises a clock manager 310 for providing, for each user device of multiple user devices, a system clock reference for transmission over a wireless, short range communication channel to the user device. The system clock reference indicates a current time according to a system clock 17 of the video synchronization server system 300. The video synchronization server system 300 also comprises a memory manager 320 for associatively storing, for each user device of the multiple user devices and in a memory 15, a clock offset received from the user device together with an identifier associated with the user device or with a user of the user device. The clock offset represents a difference between the system clock reference and a corresponding current time according to an internal clock of the user device. The memory manager 320 is also for retrieving, for each user device of the multiple user devices, the clock offset from the memory 15 based on the identifier received over a wireless media channel from the user device together with a video stream of video frames. The video synchronization server system 300 further comprises a calculator 330 for calculating, for each user device of the multiple user devices, a respective capture time according to the system clock 17 for video frames in the video stream based on a respective timestamp tagged to the video frames and the retrieved clock offset. The video synchronization server system 300 additionally comprises a time aligner 340 for time aligning video streams from the multiple user devices based on the calculated respective capture times.

In an embodiment, the video synchronization server system 300 also comprises a first and second receiver and transmitter as previously described herein in connection with FIGS. 9 and 10.

Yet another aspect of the embodiments relates to a user device that is configured to receive a system clock reference over a wireless, short range communication channel. The system clock reference indicates a current time according to a system clock available to a video synchronization server system. The user device is also configured to calculate a clock offset between the system clock reference and a corresponding current time according to an internal clock of the user device. The user device is further configured to wirelessly transmit the clock offset together with an identifier associated with the user device or with a user of the user device to the video synchronization server system. The user device is also configured to tag video frames with a respective timestamp representing a respective capture time, according to the internal clock, of the video frames by a camera of or connectable to the user device. The user device is additionally configured to transmit a video stream of the video frames together with the identifier to the video synchronization server system over a wireless media channel.

In an embodiment, the user device is configured to wirelessly transmit the clock offset together with the identifier as a VLC signal.

In an embodiment, the user device is configured to receive the system clock reference as a VLC signal detectable by the camera.

In an embodiment, the user device is configured to receive the system clock reference as the VLC signal in connection with displaying an event ticket on a screen of the user device.

In another embodiment, the user device is configured to receive a system clock reference over a wireless, short range communication channel. The system clock reference indicates a current time according to a system clock available to a video synchronization server system. The user device is also configured to calculate a clock offset between the system clock reference and a corresponding current time according to an internal clock of the user device. The user device is further configured to tag video frames with a respective timestamp representing a respective capture time, according to the internal clock, of the video frames by a camera of or connectable to the user device modified by the clock offset. The user device is additionally configured to transmit a video stream of the video frames to the video synchronization server system over a wireless media channel.

In an embodiment, the user device is configured to receive the system clock reference as a VLC signal detectable by the camera.

In an embodiment, the user device is configured to receive the system clock reference as the VLC signal in connection with displaying an event ticket on a screen of the user device.

Figure 12:
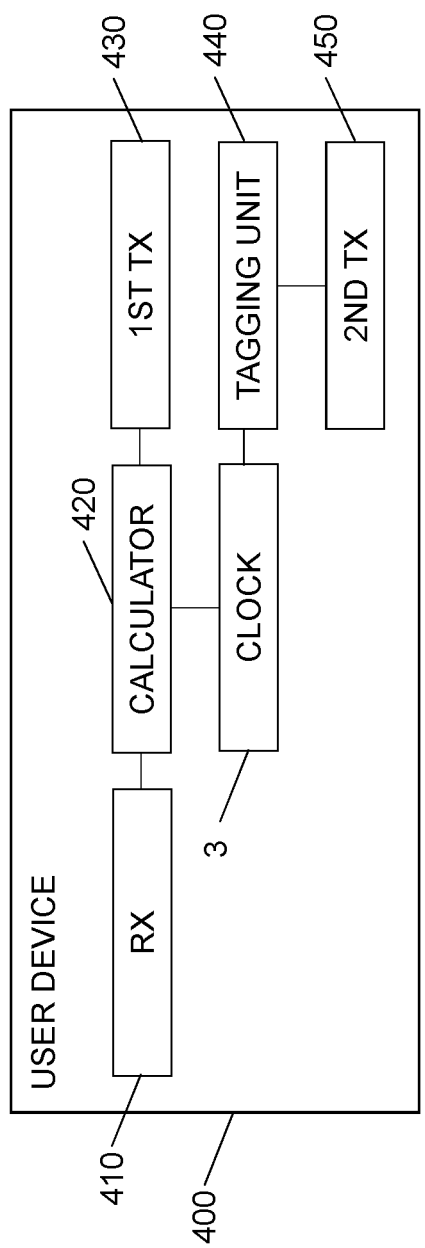
FIG. 12 schematically illustrates a block diagram of a user device according to an embodiment.

FIG. 12 is a schematic block diagram of a hardware implementation of the user device 400 according to an embodiment. The user device 400 comprises a receiver 410 configured to receive the system clock reference and a calculator 420 configured to calculate the clock offset. The user device 400 also comprises a first transmitter 430 configured to wirelessly transmit the clock offset together with the identifier and a tagging unit 440 configured to tag video frames. The user device 400 further comprises a second transmitter 450 configured to transmit the video stream of the video frames together with the identifier.

The receiver 410 is preferably implemented as a camera of the user device 400 configured to detect a VLC signal. The first transmitter 430 is implemented as a VLC transmitter, such as in the form of the screen of the user device 400 that can be lit up to generate a VLC signal. Alternatively, a lamp, such as flash, of the user device 400 could constitute the first transmitter 430. The second transmitter 450 is configured to transmit the video stream in the form of a stream of data packets transmitted over the wireless media channel of a WLAN or mobile or cellular communication network.

The receiver 410 is connected to the calculator 420 for forwarding the system clock reference thereto. The calculator 420 is also connected to an internal clock 3 of the user device 400 and to the first transmitter 430 in order to output the calculated time offset thereto. The tagging unit 440 is correspondingly connected to the internal clock 3 and the second transmitter 450 to receive information of respective capture time and output timestamped or tagged video frames to the second transmitter 450.

Figure 13:
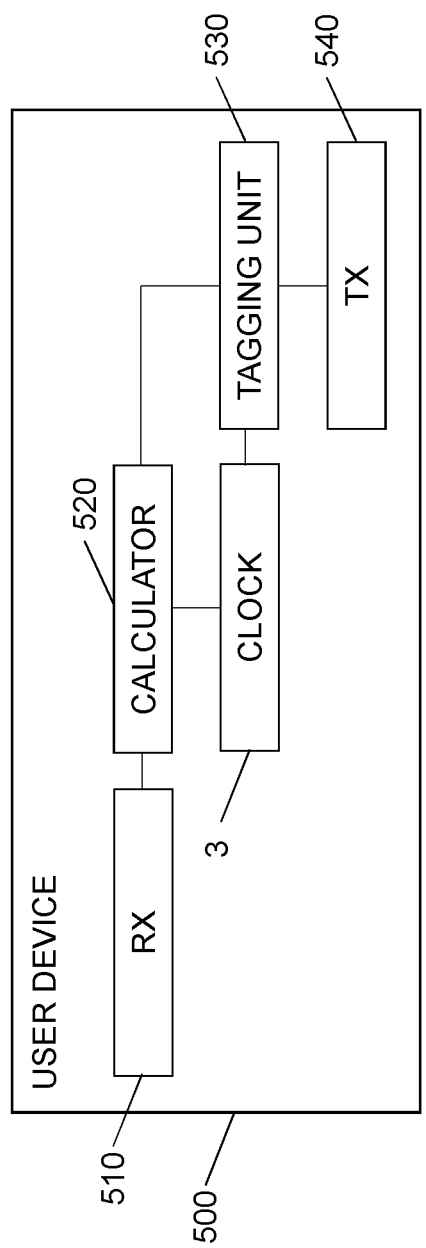
FIG. 13 schematically illustrates a block diagram of a user device according to another embodiment.

FIG. 13 is a schematic block diagram of a hardware implementation of the user device 500 according to another embodiment. The user device 500 comprises a receiver 510 configured to receive the system clock reference and a calculator 520 configured to calculate the clock offset. The user device 500 also comprises a tagging unit 530 configured to tag video frames. The user device 500 further comprises a transmitter 540 configured to transmit the video stream of the video frames.

The receiver 510 is preferably implemented as a camera of the user device 500 configured to detect a VLC signal. The transmitter 540 is configured to transmit the video stream in the form of a stream of data packets transmitted over the wireless media channel of a WLAN or mobile or cellular communication network.

The receiver 510 is connected to the calculator 520 for forwarding the system clock reference thereto. The calculator 520 is also connected to an internal clock 3 of the user device 500 and to the tagging unit 530. The tagging unit 530 thereby receives information of the respective capture times from the internal clock 3 and the calculated clock offset from the calculator 520. The tagging unit 530 outputs timestamped or tagged video frames to the connected transmitter 540.

In a particular example, the user device 600, see FIG. 14, comprises a processor 610 and a memory 620 comprising instructions executable by the processor 610. The processor 610 is operative to calculate the clock offset between the system clock reference received over the wireless, short range communication channel by a receiver 630 and the corresponding current time. The processor 610 is also operative to cause a first transmitter 640 to wirelessly transmit the clock offset together with the identifier. The processor 610 is further operative to tag the video frames and to provide the video stream of the video frames for transmission by a second transmitter 650 together with the identifier.

In another embodiment, the user device 700 comprises a processor 710, a memory 720, a receiver 730 and a transmitter 740 as shown in FIG. 15. In such a case, the memory 720 comprises instructions executable by the processor 710. The processor 710 is thereby operative to calculate the clock offset between the system clock reference received over the wireless, short range communication channel by the receiver 730 and the corresponding current time. The processor 710 is also operative to tag the video frames and to provide the video stream of the video frames for transmission by the transmitter 740.

FIG. 17 is, in an embodiment, a schematic block diagram illustrating an example of a user device 900 comprising a processor 910, an associated memory 920 and a communication circuitry 930.

In this particular example, at least some of the steps, functions, procedures, modules and/or blocks described herein are implemented in a computer program 940, which is loaded into the memory 920 for execution by processing circuitry including one or more processors 910. The processor 910 and memory 920 are interconnected to each other to enable normal software execution. A communication circuitry 930 is also interconnected to the processor 910 and/or the memory 920 to enable input and/or output of system clock reference, video frames and optionally clock offset and identifier.

In an embodiment, the computer program 940 comprises instructions, which when executed by the processor 910, cause the processor 910 to receive a system clock reference over a wireless, short range communication channel. The system clock reference indicates a current time according to a system clock available to a video synchronization server system. The processor 910 is also caused to calculate a clock offset between the system clock reference and a corresponding current time according to an internal clock. The processor 910 is further caused to wirelessly transmit the clock offset together with an identifier associated with the user device 900 or with a user of the user device 900 to the video synchronization server system. The processor 910 is also caused to tag video frames with a respective timestamp representing a respective capture time, according to the internal clock, of the video frames by a camera of or connectable to the user device 900. The processor 910 is additionally caused to transmit a video stream of the video frames together with the identifier to the video synchronization server system over a wireless media channel.

In another embodiment, the computer program 940 comprises instructions, which when executed by the processor 910, cause the processor 910 to receive a system clock reference over a wireless, short range communication channel. The system clock reference indicates a current time according to a system clock available to a video synchronization server system. The processor 910 is also caused to calculate a clock offset between the system clock reference and a corresponding current time according to an internal clock. The processor 910 is further caused to tag video frames with a respective timestamp representing a respective capture time, according to the internal clock, of the video frames by a camera of or connectable to the user device 900 modified by the clock offset. The processor 910 is additionally caused to transmit a video stream of the video frames to the video synchronization server system over a wireless media channel.

The computer program 940 may be comprised in the previously described carrier 950.

Figure 16:
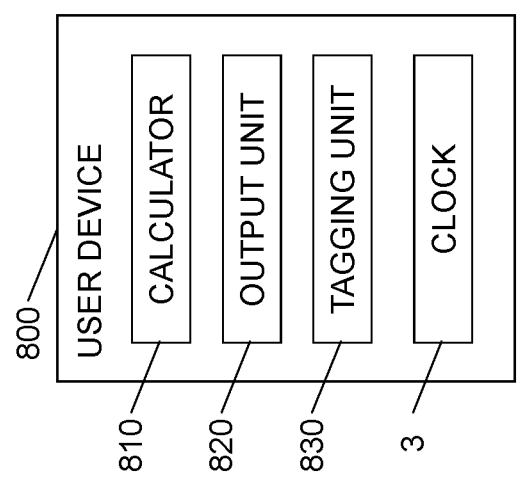
FIG. 16 schematically illustrates a block diagram of a user device according to a further embodiment.

The computer program residing in memory may thus be organized as appropriate function modules configured to perform, when executed by the processor, at least part of the steps and/or tasks described herein. An example of such function modules is illustrated in FIG. 16 illustrating a schematic block diagram of a user device 800 with function modules. The user device 800 comprises, in an embodiment, a calculator 810 for calculating a clock offset between a system clock reference received over a wireless, short range communication channel and a corresponding current time according to an internal clock 3 of the user device 800. The system clock reference indicates a current time according to a system clock available to a video synchronization server system. The user device 800 also comprises an output unit 820 for outputting the clock offset together with an identifier associated with the user device 800 or with a user of the user device 800 for wireless transmission to the video synchronization server system. The user device 800 further comprises a tagging unit 830 for tagging video frames with a respective timestamp representing a respective capture time, according to the internal clock, of the video frames by a camera of or connectable to the user device 800. The output unit 820 is, in this embodiment, also for outputting a video stream of the video frames together with the identifier for transmission to the video synchronization server system over a wireless media channel.

In another embodiment, the user device 800 of FIG. 16 comprises a calculator 810 for calculating a clock offset between a system clock reference received over a wireless, short range communication channel and a corresponding current time according to an internal clock 3 of the user device 800. The system clock reference indicates a current time according to a system clock available to a video synchronization server system. The user device 800 also comprises a tagging unit 830 for tagging video frames with a respective timestamp representing a respective capture time, according to the internal clock, of the video frames by a camera of or connectable to the user device 800 modified by the clock offset. The user device 800 further comprises an output unit 820 for outputting a video stream of the video for transmission to the video synchronization server system over a wireless media channel.

In an embodiment, the user device 800 also comprises a receiver and one or more transmitters.

The user device is preferably in the form of a mobile or portable user device, such a mobile telephone, a smart phone, a tablet, a laptop, a video camera with wireless communication circuitry, etc.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A video synchronization method, comprising:
transmitting a system clock reference over a wireless, short range communication channel to at least a first user device, said system clock reference indicating a current time according to a system clock;
wirelessly receiving a clock offset together with an identifier associated with the first user device or with a user of the first user device, said clock offset representing a difference between said system clock reference and a corresponding current time according to an internal clock of the first user device;
associatively storing said clock offset and said identifier in a memory;
receiving a first video stream of video frames together with said identifier over a wireless media channel from the first user device;
retrieving said clock offset from said memory using said identifier received together with said video frames;
calculating a respective capture time according to said system clock for video frames in said first video stream based on a respective timestamp tagged to said video frames and said retrieved clock offset; and based on said calculated respective capture time, time aligning the first video stream with at least a second video stream from a second user device.

2. The method of claim 1, wherein transmitting said system clock reference comprises transmitting said system clock reference as a visual light communication, VLC, signal detectable by a camera of or connectable to the first user device.

3. The method of claim 2, wherein transmitting said system clock reference comprises transmitting said system clock reference as said VLC signal in connection with reading an event ticket displayed on a screen of the first user device.

4. The method of claim 1, wherein wirelessly receiving said clock offset comprises receiving said clock offset together with said identifier as a visual light communication, VLC, signal.

5. The method of claim 4, wherein receiving said clock offset comprises:
reading an event ticket defining said identifier on a screen of the first user device; and
detecting a VLC signal representing said clock offset and generated by said screen of the first user device.

6. The method of claim 3, further comprising:
obtaining respective position information of the first and second user devices; and
mixing the first and second video streams based on said position information.

7. The method of claim 1, wherein associatively storing said clock offset and said identifier comprises storing said clock offset in said memory together with said identifier to enable retrieval of said clock offset from said memory using said identifier.

8. The method of claim 1, wherein time aligning said first and second video streams comprises time aligning said first and second video streams so that video frames in said first and second video streams are time aligned.

9. A video synchronization server system, the video synchronization server system comprising:
a processor; and
a memory comprising instructions executable by said processor, wherein the video synchronization server system is configured to:
transmit a system clock reference over a wireless, short range communication channel to at least a first user device, said system clock reference indicating a current time according to a system clock of said video synchronization server system;
wirelessly receive a clock offset together with an identifier associated with the first user device or with a user of the first user device, said clock offset representing a difference between said system clock reference and a corresponding current time according to an internal clock of the first user device;
associatively store said clock offset and said identifier in a memory;
receive a first video stream of video frames together with said identifier over a wireless media channel from the first user device;
retrieve said clock offset from said memory using said identifier received together with said video frames;
calculate a respective capture time according to said system clock for video frames in said video stream based on a respective timestamp tagged to said video frames and said retrieved clock offset; and
based on said calculated respective capture time, time align the first video stream with at least a second video stream transmitted by a second user device.

10. The video synchronization server system of claim 9, wherein said video synchronization server system is configured to transmit said system clock reference as a visual light communication, VLC, signal detectable by a camera of or connectable to the first user device.

11. The video synchronization server system of claim 10, wherein said video synchronization server system is configured to transmit said system clock reference as said VLC signal in connection with reading an event ticket displayed on a screen of the first user device.

12. The video synchronization server system of claim 11, wherein
said video synchronization server system is configured to obtain respective position information of the first and second user devices and mix the first and second video streams based on said position information.

13. The video synchronization server system of claim 9, wherein said video synchronization server system is configured to receive said clock offset together with said identifier as a visual light communication, VLC, signal.

14. The video synchronization server system of claim 13, wherein
said video synchronization server system is configured to read an event ticket defining said identifier on a screen of the first user device; and
said video synchronization server system is configured to detect a VLC signal representing said clock offset and generated by said screen of the first user device.

15. A user device, the user device comprising:
a processor; and
a memory comprising instructions executable by said processor, wherein the user device is configured to:
receive a system clock reference over a wireless, short range communication channel, said system clock reference indicating a current time according to a system clock available to a video synchronization server system;
calculate a clock offset between said system clock reference and a corresponding current time according to an internal clock of the user device;
wirelessly transmit said clock offset and an identifier associated with the user device or with a user of the user device to said video synchronization server system;
tag video frames with a respective timestamp representing a respective capture time, according to said internal clock, of said video frames by a camera of or connectable to the user device; and
transmit a video stream of said video frames together with said identifier to said video synchronization server system over a wireless media channel.

16. The user device of claim 15, wherein said user device is configured to wirelessly transmit said clock offset together with said identifier as a visual light communication, VLC, signal.

17. A method performed by a user device, the method comprising: receiving a system clock reference over a wireless, short range communication channel, said system clock reference indicating a current time according to a system clock available to a video synchronization server system;
calculating a clock offset between said system clock reference and a corresponding current time according to an internal clock of the user device;

wirelessly transmitting said clock offset and an identifier associated with the user device or with a user of the user device to said video synchronization server system;

tagging video frames with a respective timestamp representing a respective capture time, according to said internal clock, of said video frames by a camera of or connectable to the user device; and transmitting a video stream of said video frames together with said identifier to said video synchronization server system over a wireless media channel.

18. The user device of claim 17, wherein the user device is configured to wirelessly transmit said clock offset and said identifier by one of a screen, lamp, and flash of the user device.

19. The user device of claim 15, wherein the user device is further configured to:

output a user ticket at a screen of the user device;

wherein the system clock reference is received by a scanner or camera of the user device while the user ticket is being presented at a screen of the user device.

* * * * *